Oct. 8, 1929.  S. HORWITZ  1,730,769
LADY'S COAT WITH REMOVABLE LINING
Filed Aug. 21, 1928   2 Sheets-Sheet 2

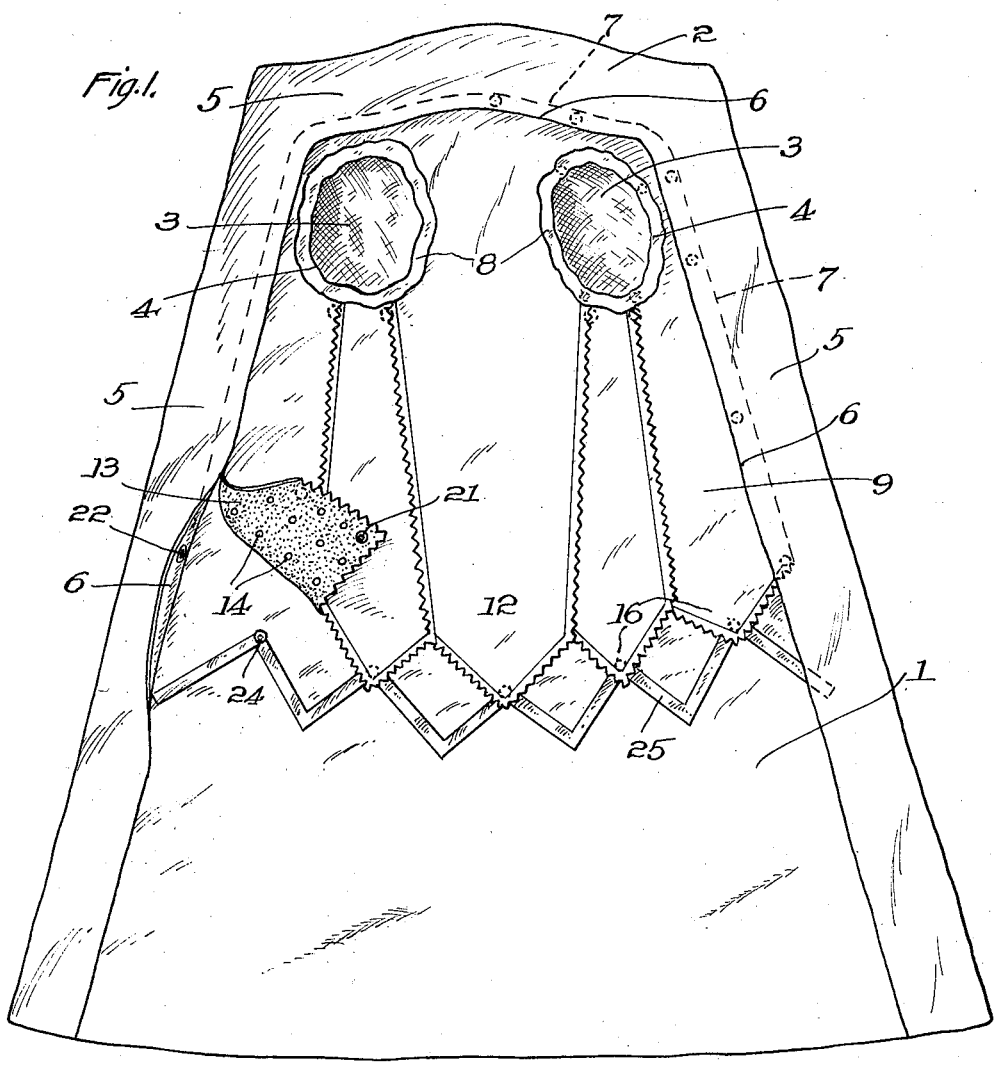
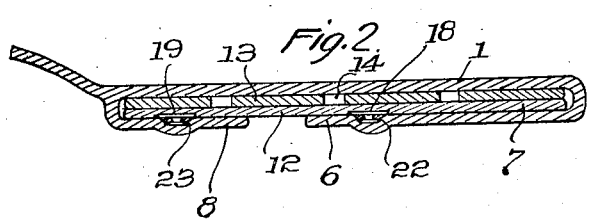

INVENTOR.
Samuel Horwitz,
BY Arthur P. Knight and
Alfred W. Knight
ATTORNEYS

Patented Oct. 8, 1929

1,730,769

UNITED STATES PATENT OFFICE

SAMUEL HORWITZ, OF LOS ANGELES, CALIFORNIA

LADY'S COAT WITH REMOVABLE LINING

Application filed August 21, 1928. Serial No. 301,105.

This invention relates to ladies' coats and the principal object thereof is to provide a coat having a removable lining of novel and advantageous design, so that the coat may be worn with equal comfort in both hot and cold weather, the lining being removed when a light coat is desired as for summer wear and being secured in position inside the coat when additional warmth is desired as for winter wear.

A particular object of the invention is to provide a removable lining consisting of two layers with an air space or layer therebetween. Said layers preferably comprise an inner layer of cloth or fabric for example such as is commonly used for lining of coats and an outer layer of chamois skin or other leather or similar material having good warmth retaining properties. A further object is to provide means for permitting ventilation or free access of air to the space between the two layers of the lining, this being preferably accomplished by providing air holes or perforations in the outer or warmth retaining layer thereof.

A further object of the invention is to provide advantageous means for securing the lining to the coat in such manner that the securing means will be invisible or substantially so, both when the lining is in place and when it is removed. For this purpose the lining and the coat are provided with suitable fastening means, such as resilient snap fasteners of the type commonly known as glove fasteners, such fasteners being provided both around the outer edges of the lining and around the arm holes thereof, and the coat is provided with an internal flap forming a pocket to receive the side and top edges of the lining, the fastening means on the coat being preferably provided on the inside of said flap, whereby said flap serves to hide the fastening means. The coat is also preferably provided with flaps around the arm holes which are similarly provided with fastening means on the inside thereof adapted to engage the fastening means on the lining, said last-named flaps also serving to conceal said fastening means.

The lower edge of the lining is also preferably fastened to the inside of the coat by means of glove fasteners, and since it is impractical to provide a flap extending across the inside of the coat to conceal the fastening members thereon at this point, I prefer to place such fastening members upon a strip or band of braid or similar material of a color similar to that of the fastening members, so that said fastening members do not show up as prominently as though they were placed directly upon the material of the coat itself.

A further object of the invention is to so shape the lower edge of the removable lining that it will not bind about the hips and cause discomfort to the wearer. For this purpose the lower edge of the lining is preferably serrated or scalloped so that the projecting flaps or points thereof may spread apart as may be necessary, the fastening means being preferably provided at the lower points or extremities of the serrations of the lining.

Other objects of the invention will appear hereinafter.

The accompanying drawings illustrate a lady's coat embodying my invention and referring thereto:

Fig. 1 is an inside view of the coat, spread out substantially flat, with the lining in place, but with one corner thereof folded back in order to illustrate the removability thereof.

Fig. 2 is a detailed section showing the flaps on the coat for covering the edge portions of the lining, both at the sides thereof and around the arm holes, said section being taken on line 2—2 in Fig. 4.

Figure 3:
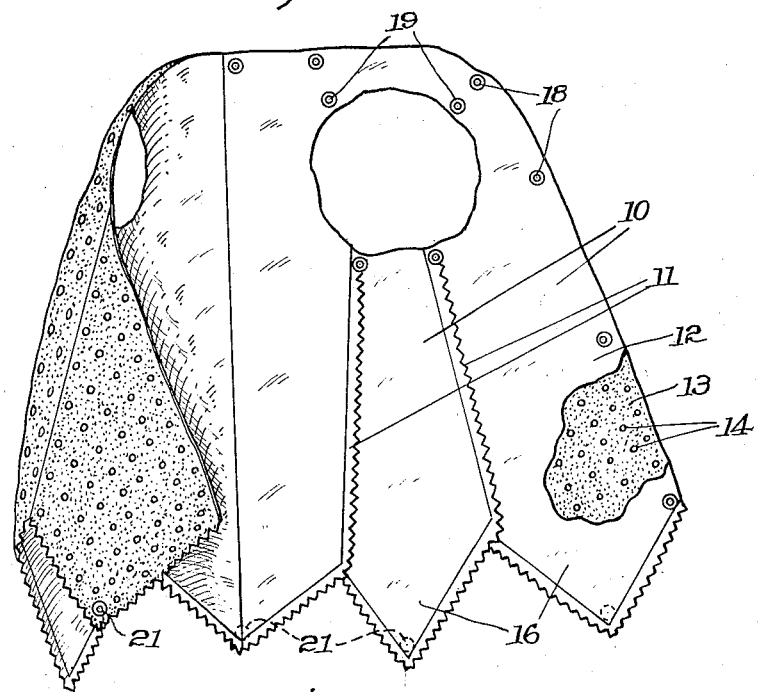
Fig. 3 is a view of the lining removed from the coat, with part of the inside layer thereof broken away.
Figure 4:
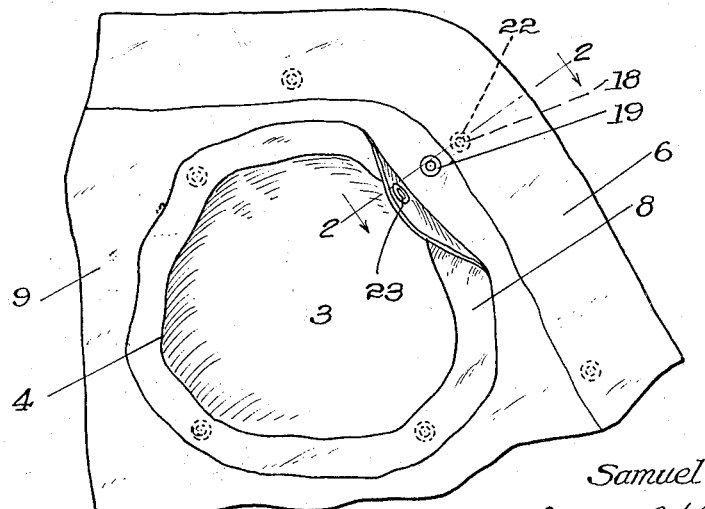
Fig. 4 is an enlarged view of a portion of the coat and lining adjacent one of the arm holes.

The coat may be of any suitable design and construction and is shown as comprising a body portion 1, collar 2 and sleeves 3 which are secured to the body portion at the edges of arm holes 4, in the usual manner. The collar 2 and the respective sides of the body portion 1 may be faced as usual with suitable material which may, for example, be the same material as used on the exterior of the coat. Such facing portions, indicated at 5 are free from the interior of the coat itself, around the collar and at the upper portions of the sides, so as to provide a concealing flap indicated at 6. A pocket is thus provided beneath said flap, adapted to receive the side and top edges of the lining as indicated at 7. Concealing flaps 8 are also secured around the edges of the arm holes 4 for concealing the corresponding edge portions of the lining.

The lining 9 preferably comprises, as shown particularly in Fig. 3, a plurality of sections 10 sewed together along their adjoining edges as indicated at 11, this sectional construction being provided principally for the purpose of permitting adjustment of the size of the lining. Each of said sections comprises an inner layer 12 formed of cloth of any suitable coloring and design for forming an attractive lining and an outer layer 13 of chamois skin or other leather, or other suitable warmth retaining material. Said layers are sewed together around the edges of each section of the lining so as to provide an air space or layer therebetween. In order to permit access of air to such air space and thus thoroughly ventilate the lining and keep the same in a hygienic condition, the outer layer 13 is preferably provided with a multiplicity of small openings 14 distributed over its surface. The lining is preferably provided with serrations or scallops 16 at its lower edge for the above mentioned purpose of preventing binding about the hips of the wearer.

A plurality of fastening devices, consisting for example of the head members of ordinary glove fastening devices, are fastened to the inner face of the lining at suitable intervals along the side and top edges thereof as indicated at 18, and similar means are also provided around the arm holes, as indicated at 19. Fastening means, which may consist, for example, of the socket members of ordinary glove fasteners are also provided at intervals along the lower edge of the outer face of the lining as indicated at 21, and said fasteners are preferably provided at the tips or lower extremities of the serrations 16 aforesaid.

Fastening means such as the socket members of glove fasteners may be secured to the under side of the flaps 6 and 8 above mentioned, at points corresponding to the arrangement of the head members on the lining, as indicated at 22 and 23 respectively. The fastening means on the coat for securing the lower edge of the lining may comprise glove fastener heads 24, which are preferably placed upon a strip 25 of braid or other material secured to the interior of the coat and preferably having a color resembling that of the fasteners 24 so as to partially mask or camouflage said fasteners. In order to further improve the appearance of this portion of the coat, the strip 25 is preferably disposed in zig-zag fashion as shown, with the upwardly projecting points 26 thereof disposed in positions corresponding to the tips or lower extremities of the serrations 16, and the fasteners 24 are mounted at said upwardly projecting points. When the lining is secured, the serrations thereof slightly overlap the points 26 of strip 25 and an effect of a row or series of diagonally disposed squares is produced.

The lining 9 extends up to the collar 2 and above and completely around the arm holes 3, and the fastening means aforesaid fasten the lining to the coat directly below the collar and completely around the arm holes, and the flaps above described are attached to the coat adjacent the collar, the sides of the coat and the arm holes and completely around the arm holes, so as to conceal the edges of the lining and give the same appearance as a permanent coat lining.

The above described garment may be worn with the lining secured in place, as shown in Fig. 1 with the exception that the lower left-hand corner of the lining which is there shown as turned back for purpose of illustration is, of course, also secured in position and the flap 6 folded down to cover the edge of the same. When so worn the garment affords great warmth to the wearer due to the warmth retaining properties of the chamois skin layer of the lining. If, on the other hand, it is desired to adapt the coat for wear during warm weather, the lining may be readily removed by loosening all of the securing means and simply pulling the lining out from beneath the flaps 6 and 8, and the coat may then be worn without the lining. It is evident that whether the lining is in place or not the fastening means 18 and 19 on the lining and the fastening means 22 and 23 on the inside of the flaps 6 and 8 are concealed from view and the garment, therefore, has substantially the appearance of an ordinary coat with a lining permanently secured therein. When the lining is in place the fastening means 21 on the coat are also concealed from view. When the lining is removed, however, the fasteners 24 on the coat are visible, but owing to the fact that the strip 25 resembles said fasteners in color, said fasteners will be camouflaged thereby and can only be discerned upon close inspection.

If desired, the lining may be worn separately, for example as a vest for indoor wear during cold weather, the chamois skin lining thereof affording great warmth when so worn.

I claim:

1. A lady's garment comprising a coat body provided with a collar and with arm holes, a removable lining for said coat fitting inside the upper portion thereof and extending up to the collar and completely around the arm holes, the inside of said coat being provided with flaps and the edges of said lining fitting underneath said flaps, and cooperating fastening means on the under side of said flap and on the top and side edge portions of said lining for securing said lining in place, said flaps serving to conceal said fastening means.

2. A lady's garment comprising a coat, a removable lining for said coat fitting inside the upper portion thereof and extending above and completely around the arm holes thereof and having openings fitting around the said arm holes, and means detachably securing said lining to said coat at the side, top and bottom edges of said lining and also completely around said arm holes.

3. A lady's garment as set forth in claim 2, said garment being provided with a flap adapted to extend over and conceal the top and side edges of said lining and being also provided with flaps extending completely around the arm holes adapted to extend over and conceal the adjacent portions of the lining.

4. A lady's garment as set forth in claim 2, said coat being provided with flaps adapted to extend over and conceal the top and side edges of the lining and with flaps around the arm holes adapted to extend over and conceal the adjacent edge portions of the lining, the fastening means for the top and side edges of the lining comprising fastening members on the under side of the first-named flap and cooperating fastening members on the edge portions of the lining, and the fastening means around the arm holes comprising fastening members on the under side of the last-named flaps and cooperating fastening members on the portions of the lining underneath said flaps.

5. A lady's garment as set forth in claim 2, the lower edge of said lining being provided with serrations and the fastening means at the lower edge of the lining comprising fastening members on the under side of the lower extremities of said serrations and cooperating fastening means on the inside of the coat.

In testimony whereof I have hereunto subscribed by name this 14th day of August, 1928.

SAMUEL HORWITZ.